Figure 1:
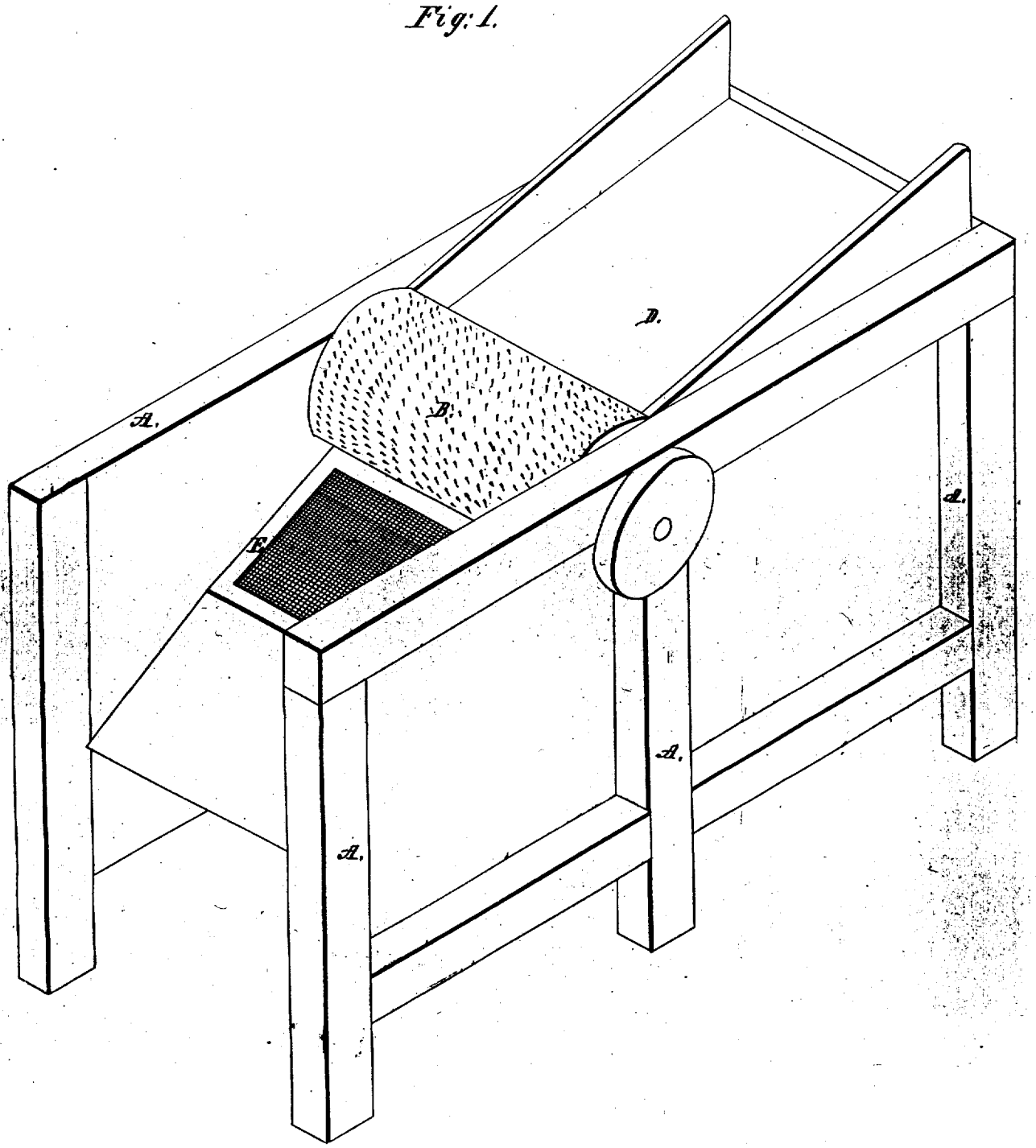
Figure 4:
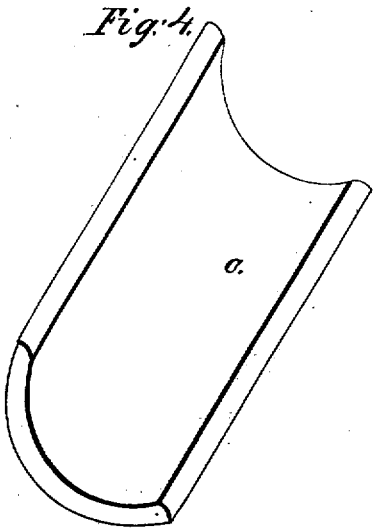
Figure 3:
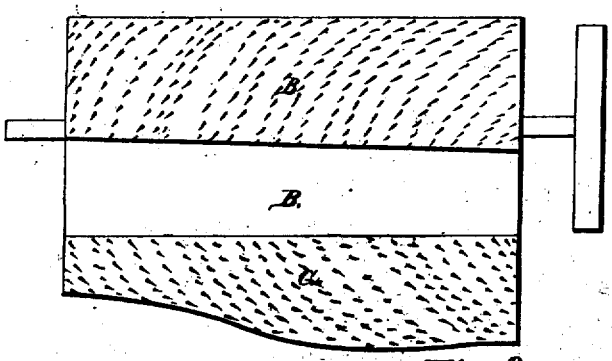
Figure 2:
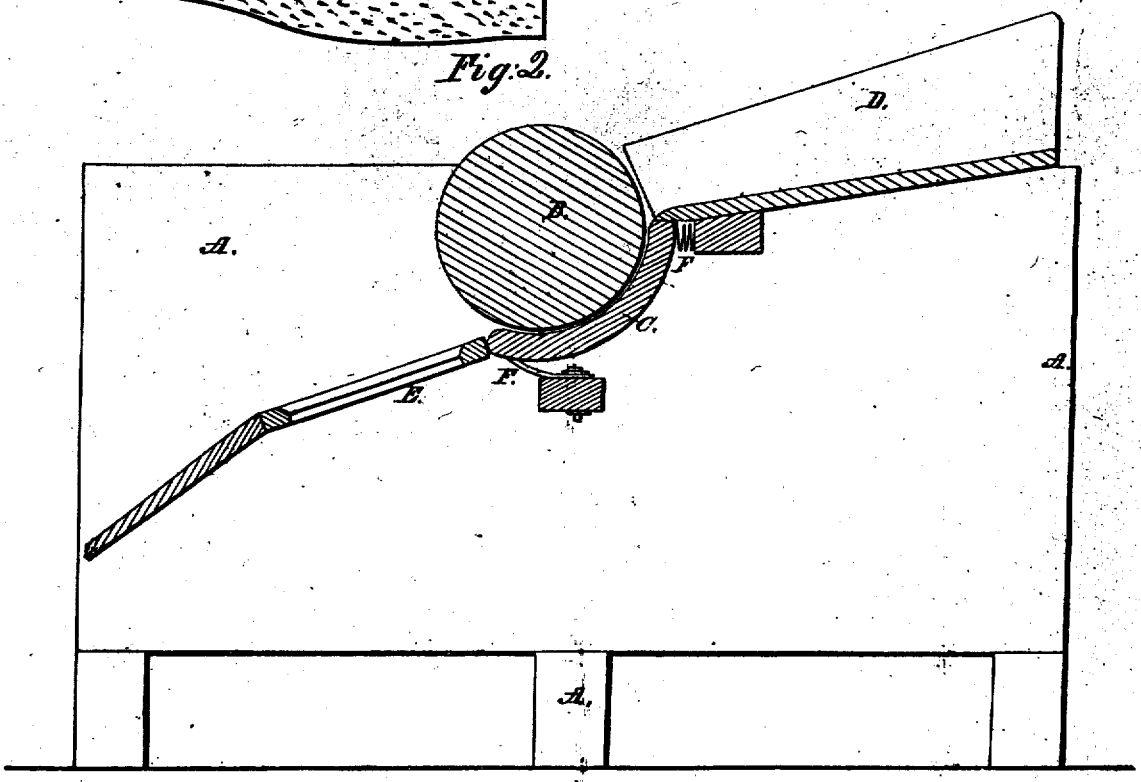

Sheet 1, 2 Sheets.

8547½X

Beck & Jenks.

Cotton Seed Huller.

Patented Dec. 17, 1834.

No Printed Specification Available

Sheet 2, 2 Sheets.

8547½X

Beck & Jenks.

Cotton Seed Huller.

Patented Dec. 17, 1834.

TEMPORARY NOTICE of BEST AVAILABLE IMAGE

U. S. PATENT AND TRADEMARK OFFICE

---

THE SCANNED IMAGES OF PATENT NUMBER 8547 1/2 X FOR THE ISSUE DATE OF 12/17/1834 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

---

TEMPORARY NOTICE of BEST AVAILABLE IMAGE